United States Patent [19]
Davis

[11] Patent Number: 6,092,494
[45] Date of Patent: Jul. 25, 2000

[54] CONTROLLED PRESSURE RISE IN TWO-CYCLE INTERNAL COMBUSTION ENGINE HAVING CYLINDER WALL FUEL INJECTION

[75] Inventor: Richard A. Davis, Mequon, Wis.

[73] Assignee: Brunswick Corporation, Lake Forest, Ill.

[21] Appl. No.: 09/013,954

[22] Filed: Jan. 27, 1998

[51] Int. Cl.$^7$ ................ F02B 3/00; F02B 33/04
[52] U.S. Cl. .................... 123/65 PE; 123/73 C
[58] Field of Search .............. 123/65 PE, 65 P, 123/73 C

[56] References Cited

U.S. PATENT DOCUMENTS

| | | |
|---|---|---|
| 3,026,862 | 3/1962 | Fisher . |
| 3,196,926 | 7/1965 | Gartland . |
| 3,831,563 | 8/1974 | Brittain et al. . |
| 3,835,822 | 9/1974 | Mickle et al. . |
| 3,993,030 | 11/1976 | Jaulmes . |

(List continued on next page.)

FOREIGN PATENT DOCUMENTS

0302045 B1  7/1988  European Pat. Off. .

OTHER PUBLICATIONS

A Study of Two–Stroke Cycle Fuel Injection Engines for Exhaust Gas Purification, Yamagishi et al., Automotive Engineering and Exposition, Jan., 1972, pp. 253–272.

Fuel Injection of a Two–Stroke Cycle Spark Ignition Engine, R. Douglas et al., SAE The Engineering Resource for Advancing Mobility, #820952, Aug. 16–19, 1982, pp. 1–14.

Low–Pressure Discontinuous Gasoline Injection in Two–Stroke Engines, Grasas–Alsina et al., SAE The Engineering Resource for Advancing Mobility, #860168, Feb. 24–28, 1986, pp. 1–14.

The Nozzle Location and the Shape of Its Surroundings in the cylinder of Small Two–Stroke Engine, Francisek et al., SAE The Engineering Resource for Advancing Mobility, #860169, Feb. 24–28, 1986, pp. 1–7.

Mixture injection application for avoiding charge exchange losses in two–stroke cycle engines, Kuntscher et al., IMechE, 1989, C372/025, pp. 117–122.

Fuel Atomization With Mixture Preparation Systems of SI–Engines, Lenz et al. #885015, pp. 1.109–1.117.

Comparative Investigation on Fuel Feed Methods in Two–Stroke Cycle Methanol Engine, Kubota et al., SAE International, #922312, Oct. 19–22, 1992, pp. 1652–1659.

Gasoline Direct Injection for a Loop–Scavenged Two–Stroke Cycle Engine, Sato et al., SAE #871690, Sep. 14–17, 1987, pp. 1–14.

Direct Fuel Injection: Piaggio Approach to Small 2T SI Engines, Nuti, SAE $880172, Feb. 29–Mar. 4, 1998, pp. 1017.

Low–Pressure Electronic Fuel Injection System for Two–Stroke Engines, Vieilledent, Society of Automotive Engineers, Technical Paper Series, #780767, Sep. 11–14, 1978, pp. 1–14.

200 DFI (Direct Fuel Injected) Service Manual, Brunswick Corp., 90–850153R1, Mar. 1996, p. 36.

*Primary Examiner*—Marguerite McMahon
*Attorney, Agent, or Firm*—Andrus, Sceales, Starke & Sawall

[57] ABSTRACT

A two-cycle internal combustion engine implements low-pressure, cylinder wall fuel injection and uses a notched exhaust port or the like to control cylinder pressure rise during exhaust port closure. An electronic control unit controls the operation of fuel injection through the cylinder wall. Fuel injection terminates before the piston closes the exhaust port as the piston travels from bottom dead center to top dead center. The exhaust port notch tempers pressure gradients and pressure fluctuations in the piston cavity that can otherwise occur before the exhaust port closes and can be detrimental to the control of low-pressure fuel injectors. The exhaust port notch allows better fuel injection control, especially at idle or low speeds, without requiring the port positions and configurations to be modified which could compromise engine performance at medium or high speeds.

20 Claims, 6 Drawing Sheets

U.S. PATENT DOCUMENTS

| | | |
|---|---|---|
| 4,088,098 | 5/1978 | Rose et al. . |
| 4,290,394 | 9/1981 | Frank et al. . |
| 4,337,734 | 7/1982 | Iio ........................................ 123/65 PE |
| 4,446,830 | 5/1984 | Simko et al. . |
| 4,458,636 | 7/1984 | Kania ................................... 123/65 PE |
| 4,491,117 | 1/1985 | Koide . |
| 4,566,409 | 1/1986 | Yashiro et al. ...................... 123/65 PE |
| 4,643,140 | 2/1987 | Whipple .............................. 123/65 PE |
| 4,721,075 | 1/1988 | Kasai . |
| 4,768,474 | 9/1988 | Fujimoto et al. . |
| 4,768,492 | 9/1988 | Widmer et al. . |
| 4,787,343 | 11/1988 | Tuckey . |
| 4,790,270 | 12/1988 | McKay et al. . |
| 4,941,999 | 7/1990 | Noisier . |
| 5,020,485 | 6/1991 | Watanabe . |
| 5,058,548 | 10/1991 | Morikawa et al. . |
| 5,078,167 | 1/1992 | Brandt et al. . |
| 5,086,734 | 2/1992 | Nakai .................................... 123/65 PE |
| 5,092,287 | 3/1992 | Motoyama et al. .................. 123/73 C |
| 5,103,793 | 4/1992 | Riese et al. . |
| 5,115,776 | 5/1992 | Ohno et al. . |
| 5,156,134 | 10/1992 | Tochizawa . |
| 5,237,966 | 8/1993 | Katoh et al. . |
| 5,259,344 | 11/1993 | Huang et al. . |
| 5,284,111 | 2/1994 | Geyer et al. . |
| 5,335,635 | 8/1994 | Kadoi et al. . |
| 5,389,245 | 2/1995 | Jaeger et al. . |
| 5,404,856 | 4/1995 | Servati . |
| 5,450,830 | 9/1995 | Katoh . |
| 5,553,579 | 9/1996 | Yoshida et al. . |
| 5,732,674 | 3/1998 | Motoyama et al. .................... 123/73 C |
| 5,762,040 | 6/1998 | Taipale et al. ......................... 123/73 C |
| 5,775,289 | 7/1998 | Yoshida et al. ....................... 123/73 C |
| 5,791,304 | 8/1998 | Taipale . |

CONTROLLED PRESSURE RISE IN TWO-CYCLE INTERNAL COMBUSTION ENGINE HAVING CYLINDER WALL FUEL INJECTION

FIELD OF THE INVENTION

The invention relates to low-pressure cylinder wall fuel injection systems for two-cycle internal combustion engines. In particular, the invention involves the use of a notched exhaust port or the like to temper pressure rise during the piston compression stroke, thereby improving the performance of low-pressure fuel injectors when fuel is injected relatively late in the cycle.

BACKGROUND OF THE INVENTION

Multi-cylinder, two-cycle internal combustion engines are commonly used in the marine industry for propulsion, (e.g., in outboard motors and in jet propelled watercraft). In conventional two-cycle internal combustion engines having carburetors, the configuration and position of transfer ports and exhaust ports are selected to optimize engine performance under normal operating conditions at medium or high speeds. In some carbureted engines, the selected configuration and position of transfer ports causes rough idling. In these engines, it is known to notch the exhaust port to provide for good idling stability.

Emissions from conventional two-cycle engines having carburetors contain excessive amounts of unburned hydrocarbons for soon to be implemented environmental regulations, especially when operating at low speeds or idle. In a two-cycle engine having a carburetor, fuel is mixed with intake air at the carburetor upstream of the combustion cylinders. Therefore, air used to scavenge exhaust out of the combustion cylinder is mixed with fuel. Because the scavenging process is not perfect, some of the incoming fuel/air mixture passes directly through the exhaust port without being combusted. This phenomenon is called short-circuiting, and is a significant source of unburned hydrocarbons in emissions from conventional two-cycle engines.

Replacing carburetors with electronic fuel injectors that inject fuel directly into the combustion cylinder substantially reduces the amount of unburned hydrocarbons in the engine exhaust as long as fuel injection is timed and coordinated properly. In crankcase fuel injected engines it is not necessary to notch the exhaust port to provide for good idling stability. In high-pressure direct fuel injection systems, fuel is typically injected after the piston has covered the exhaust port thus assuring that injected fuel will not short-circuit through the exhaust port before the scavenging process is completed. However, as the piston compresses the volume in the piston cavity above the top of the exhaust port, pressure within the combustion chamber increases greatly, and pressure fluctuations within the cylinder can be significant and erratic. Therefore, high-pressure direct fuel injection systems normally implement sophisticated fuel injection techniques (e.g. air-assisted fuel injection requiring the use of an air compressor) to facilitate reliable fuel injection into the high-pressure environment within the piston cavity during compression.

On the other hand, cylinder wall fuel injection (CWI) systems inject fuel into the combustion chamber before the piston covers the exhaust port when the pressure in the combustion chamber is more nearly ambient. Cylinder wall fuel injection systems are more practical because CWI systems can use conventional, low-pressure automotive-type fuel injectors (e.g. 40 to 100 psi), and typically do not need sophisticated pumps or the like to maintain proper fuel injection control. Accurate fuel injection depends in large part on whether the pressure drop across the fuel injector into the piston cavity is predictable. If the pressure drop across the fuel injector is not predictable, it is difficult or even impossible for an electronic controller to accurately meter fuel injection for optimum performance, emissions, etc. by merely opening and closing the injector at the proper time.

Even though pressure fluctuations during fuel injection in low-pressure cylinder wall fuel injection (CWI) systems are not as severe as in high-pressure direct fuel injection systems, abrupt pressure gradients occurring during the piston up-stroke before the exhaust port is fully closed can have adverse effects on fuel injection control in low-pressure cylinder wall fuel injection (CWI) systems. For instance, cylinder pressure may begin to rise before the exhaust port is closed when the engine is at idle or low speeds. Cylinder pressure begins to rise even earlier when the engine is operating at medium or high speeds due to exhaust tuning effects. Therefore, fuel injection into the cylinder late in the cycle using a low-pressure cylinder wall fuel injection system is unreliable.

In two-cycle CWI engines or in carbureted two-cycle engines, the configuration and position of transfer ports and exhaust ports are selected to optimize engine performance under normal operating conditions at medium or high speeds. However, in order to further optimize engine running quality and/or emissions (especially at idle), it may be desirable to inject fuel into the cylinder relatively late in the cycle. This is difficult to do reliably because the abrupt pressure gradients begin in the cylinder at and just after exhaust port closure.

BRIEF SUMMARY OF THE INVENTION

The invention is a two-cycle internal combustion engine having cylinder wall fuel injection (CWI) and implementing controlled pressure rise to facilitate reliable fuel injection into the cylinder a few more timing degrees closer to exhaust port closure. The invention accomplishes this by providing an exhaust pressure relief notch in the exhaust port, hole or the like in the cylinder wall near the exhaust port (or in the piston head near the exhaust port).

Fuel injection into the cylinder is terminated before the exhaust port is substantially fully closed. The notch or hole is sized to maintain predictable cylinder pressures later in the piston cycle, but should be sufficiently small in relation to the exhaust port so that the hole or notch does not otherwise adversely affect engine performance (e.g. about 3% of exhaust flow area). Using the invention, abrupt pressure gradients and fluctuations are delayed and tempered as the piston continues to cover the exhaust port. Thus, fuel injection into the cylinder is more reliable at this point in the cycle without modifying the location and/or configuration of the exhaust port itself.

In a preferred embodiment of the invention, the combustion cylinder wall consists of a cylinder sleeve that is fitted into a bore in the engine block, and the exhaust port notch or hole is physically located exclusively in the cylinder sleeve. In this manner, an exhaust port notch can be implemented without having to machine or cast a notch into the engine block. Several other embodiments of the invention are also disclosed and claimed herein.

The invention is useful in loop-scavenged, two-cycle internal combustion engines, and can also be useful in cross-scavenged, two-cycle internal combustion engines.

Other objects and advantages of the invention may be apparent to those skilled in the art upon review the drawings and the following description thereof.

DETAILED DESCRIPTION OF THE INVENTION

The invention involves the use of low-pressure cylinder wall fuel injection in an internal combustion engine 10. The engine 10 preferably includes a plurality of parallel combustion cylinders 12, however, the drawings illustrate the structure and operation of the system in reference to a single combustion cylinder 12. In accordance with the invention, at least one of the combustion cylinders 12 in the engine includes means for controlling cylinder pressure rise and fluctuation as the piston moves upward to cover the exhaust port. In the preferred embodiment of the invention shown in FIGS. 1–7, the exhaust port 14 includes a pressure relief notch 16 to control abrupt cylinder pressure rise as the piston moves upward to cover the exhaust port 14. Therefore, fuel can be reliably injected into the cylinder late in the cycle (e.g. 2° to 3° later in the cycle).

Figures 1, 2, 3:
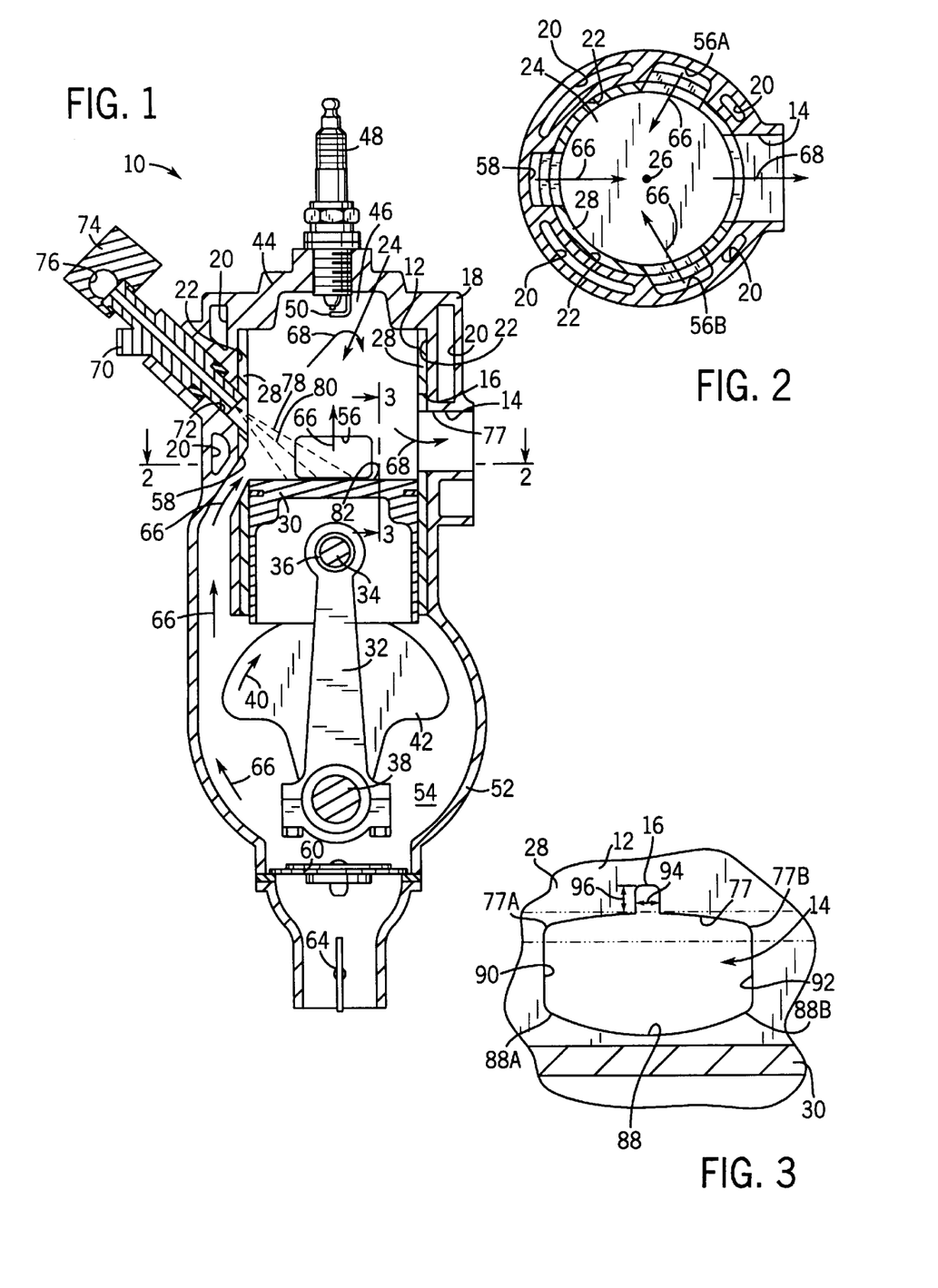
FIG. 1 is a side view of a combustion cylinder for a loop-scavenged, two-cycle internal combustion engine having a low-pressure, cylinder wall fuel injection system and a notched exhaust port in accordance with the invention.
FIG. 2 is a view taken along lines 2—2 in FIG. 1.
FIG. 3 is a view taken along line 3—3 in FIG. 1.

Referring to FIG. 1, the engine 10 shown in FIGS. 1–20 is a loop-scavenged, two-cycle internal combustion engine 10. The engine includes a water cooled engine block 18. Liquid coolant flows through cooling jackets 20 in the engine block 18 to cool the engine 10. The engine block 18 includes a piston cylinder wall 22 which defines a piston cavity 24 having a substantially cylindrical shape around a longitudinal cylinder axis 26, FIG. 2. A piston sleeve 28 is preferably fitted into the cylinder block 18 to precisely define the piston cavity 24 as is well known in the art.

A piston 30 reciprocates longitudinally through the piston cavity 24 along the cylinder axis 26. The piston 30 is connected to a connecting rod 32 via a piston pin 34 that is attached to the piston 30. The connecting rod 32 includes a bearing mechanism 36 around the piston pin 34 as is known in the art. The connecting rod 32 is attached to a crankshaft 38. When the engine 10 is operating, the piston 30 reciprocates longitudinally through the piston cavity 24 and moves the connecting rod 32 to drive crankshaft 38 in a clockwise direction as indicated by arrow 40 on counterweight 42 as is well known in the art. A cylinder head 44 connected to or integral with the cylinder block 18 closes off the combustion cylinder 12 to define a combustion chamber 46 that is in communication with the piston cavity 24 above the piston 30. A spark plug 48 is mounted through the cylinder head 44 so that a spark plug ignition electrode 50 is exposed to the combustion chamber 46.

Figures 4, 5:
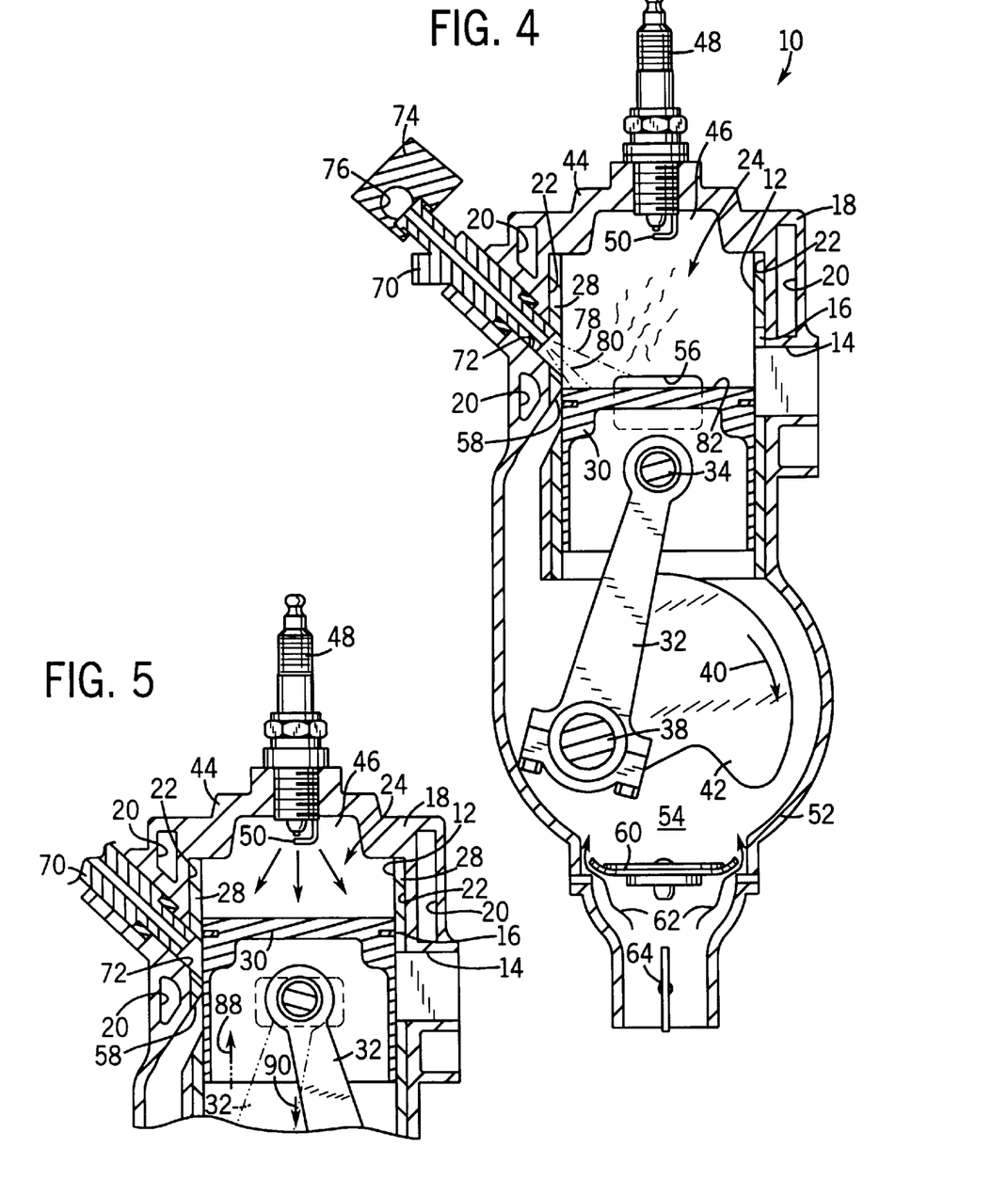
FIG. 4 is a view similar to FIG. 1 in which the piston has moved upward from bottom dead center to partially cover the exhaust port in the combustion chamber.
FIG. 5 is a partial view similar to FIGS. 1 and 4 in which the piston has moved further upward to completely cover the notched exhaust port in the combustion cylinder.

A crankcase 52 is connected to the cylinder block 18 and defines a charging chamber 54. The charging chamber 54 is in communication with the piston cavity 24 on the side of the piston 30 opposite the combustion chamber 46. The cylinder 12 includes two transfer ports 56A, 56B (see FIG. 2) and a boost port 58. Transfer passages pass through the engine block 18 from the charging chamber 54 below the piston 30 through the respective transfer port 48A, 48B and boost port 50, and into the portion of the piston cavity 24 communicating with the combustion chamber 46. Referring to FIG. 4, fresh air enters the charging chamber 54 in the crankcase 52 through a one-way read valve 60 when the piston 30 moves from bottom dead center upward, as indicated by arrows 62. The amount of air flowing through read valve 60 is controlled by the position of throttle body 64 which is positioned upstream of the one-way read valve 60. Referring again to FIG. 1, FIG. 1 illustrates the end of the scavenging process (and the beginning of fuel injection). As the piston 30 moves downward in the piston cavity 24, the pressure in the charging chamber 54 increases, thus closing read valve 60 and pushing fresh air as indicated by arrows 66 through the transfer ports 56A, 56B and the boost port 58 into the portion of the piston cavity 24 above the piston 30 communicating with the combustion chamber 46. The fresh charge of air through the transfer ports 48A, 48B and boost port 50 flows through the cylinder wall 12 into the piston cavity 24 to begin scavenging combustion products through the exhaust port 14 as indicated by arrows 68. In the preferred embodiment, the transfer ports 56A, 56B are symmetrically located across the combustion chamber 12 with respect to the exhaust port 14. In addition, it is preferred that the boost port 58 be located symmetrically between the transfer ports 56A and 56B.

Referring in particular to FIG. 2, the transfer ports 56A, 56B are oriented so that air flowing from the transfer ports 56A, 56B into the piston cavity 24 is directed away from the exhaust port 14, and also preferably so that air flow from the transfer ports 56A, 56B into the piston cavity 24 is relatively horizontal with respect to the longitudinal cylinder axis 26 as air initially flows into the piston cavity 24. When the flow of air from transfer port 56A converges with the flow of air from transfer port 56B, the converged air flow ascends upwards towards spark plug electrode 50, FIG. 1. The boost port 58 enters the piston cavity 24 180° around the cylinder from the centerline of the exhaust port 14. The boost port 58 is configured so that air flowing from the boost port 58 into the piston cavity 24 flows upward towards the spark plug electrode 50, FIG. 1. Air flow through the boost port is typically substantially less than air flow through the transfer ports 56A, 56B. The purpose of the boost port 58 is to help scavenge the area of the piston cavity 24 directly in front of the boost port 58. It is advantageous that the direction of air flow from the boost port 58 into the piston cavity 24 be upward towards the spark plug electrode 50 so that air flow from the boost port 58 is not directed at the exhaust port 14.

An electrically controlled low-pressure fuel injector 70 is mounted in an opening 72 through the cylinder block 18. The opening 72 through the cylinder block 18 continues to pass through the cylinder sleeve 28 into the piston cavity 24. The fuel injector 70 may be a conventional automotive-type fuel injector that receives fuel from a fuel rail 74 at a relatively low-pressure, for example 40 to 100 psi. The fuel rail 74 includes a fuel supply canal 76 which supplies fuel to the fuel injector 70. The fuel injector 70 is opened and closed by an electronic control unit. The timing and the amount of fuel injection into the piston cavity 24 depends on several factors, including throttle position, engine load and engine speed, etc. As is discussed in more detail below, it is desirable that fuel injection terminate before the piston 30 completely covers the exhaust port, and also before the pressure gradients and fluctuations within the cylinder due to compression begin to rise substantially.

At the location where opening 72 through the engine block 18 and the cylinder sleeve 28 opens into the piston cavity 24, a substantial portion of the opening 72 is located below the top edge 77 of the exhaust port 14. However, the exhaust port pressure relief notch 16 extends along the cylinder wall upward from the top edge 77 of the exhaust port 14 towards top dead center. Due to the location of the fuel injector opening 72 through the engine block 14 and the cylinder sleeve 28, fuel must be injected substantially before the exhaust port 14 closes. This means that pressure within the piston cavity 24 is very nearly atmospheric during the time that fuel is injected into the piston cavity 24, although some pressure fluctuations do occur. One of the advantages of cylinder wall fuel injection (CWI) in two-cycle engines, especially when fuel injection is accomplished before closure of the exhaust port, is that relatively low-pressure fuel injectors 70 can be used without compromising fuel injection efficiency and control, as long as fuel injection can be accomplished under relatively predictable pressure conditions within the piston cavity 24. The presence of the pressure relief notch 16 in the exhaust port 14 improves the predictability of pressure within the piston cavity 24 as the piston 30 moves upward before and as the piston 30 covers the exhaust port 14. Using the pressure relief notch 16, cylinder pressure can be predicted reliably for an additional ten crankshaft degrees (10°), thereby facilitating accurate fuel injection for the additional 10° even if low-pressure automotive type fuel injectors are used.

When the fuel injector 70 is open, a spray of fuel 78 is injected from the fuel injector 70 into the piston cavity 24. The opening 72 through the cylinder block 18 and the cylinder sleeve 28 is oriented so that center axis 80 of the fuel spray 78 from the fuel injector 70 is directed at an angle greater than about 40° with respect to a plane normal to the longitudinal cylinder axis 26 (i.e., at an angle than about 40° with respect to the piston crown 82 when the piston 30 is at bottom dead center). Thus, the injector spray axis 80 intersects the piston crown surface 82 underneath the converging air flows from the transfer ports 56A, 56B, preferably at a 45° angle with respect to the piston crown 82. The spray 78 from the fuel injector 70 impinges on the piston crown 82 which is very hot. Many if not most of the liquid spray droplets vaporize upon contacting the piston crown 82. Vaporized fuel burns more efficiently than liquid fuel droplets.

When the engine 10 is operating at low speeds or idling, it is desirable that fuel be injected into the piston cavity 24 late in the cycle (yet before the exhaust port 14 closes) to reduce the likelihood of short-circuiting unburned fuel through the exhaust port 14. FIGS. 1, 4, 5 and 6 generally illustrate the operation of the cylinder wall fuel injection system in an engine 10 that is idling or operating at low speeds. FIG. 1 shows the piston 30 at bottom dead center, and illustrates that fresh air has been forced into the piston cavity 24 through boost port 58 and transfer ports 56A, 56B to scavenge the piston cavity 24 of exhaust. In FIG. 1, fuel has just begun to be injected into the piston cavity 24, however, at idle it may be desirable to begin fuel injection later in the cycle for particular cylinders in the engine. FIG. 4 shows the piston 30 along its upward stroke, and shows fuel being injected into the piston cavity 24 directly onto the piston crown 82. Upward scavenging air flows at this point in the cycle are minimal, however, short-circuiting of unburned fuel through the exhaust port 14 is minimized because fuel injection is occurring relatively late in the cycle. In FIG. 4, fuel is being injected early enough in the cycle so that fuel injection occurs when pressure within the piston cavity 24 is predictably nearly ambient pressure. Note that the fuel injector spray axis 80 enters the piston cavity 24 at a height substantially lower than the top edge of the pressure relief notch 16.

Figures 6, 7, 8:
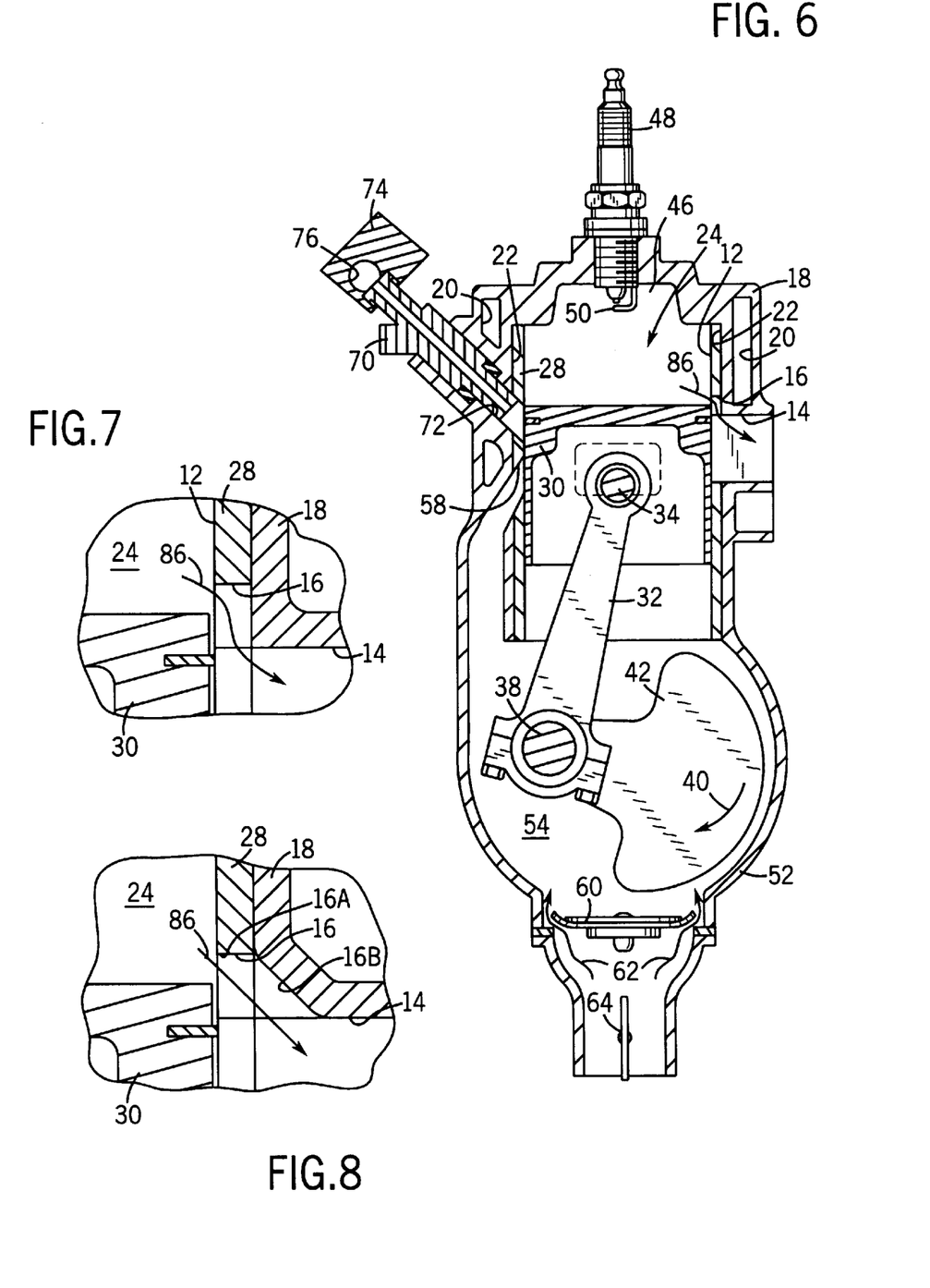
FIG. 6 is a view similar to FIGS. 1, 4 and 5 showing the piston moving upward during the compression stroke in a position in which the piston partially covers the exhaust port pressure relief notch.
FIG. 7 is a detailed view of the exhaust port notch with the piston in the same position as shown in FIG. 6.
FIG. 8 is a detailed view similar to FIG. 7 showing a second embodiment of the invention.

FIG. 6 shows the piston 30 further along in its upward stroke. Fuel can no longer be injected into the piston cavity 24 because the piston 30 covers the fuel injector opening 72 through the cylinder wall 22 and piston sleeve 28. However, in FIG. 6, the piston has not yet fully covered the pressure relief notch 16 in the exhaust port 14, thereby ensuring that excessive pressure gradients and fluctuations do not occur within the piston cavity 24 before fuel injection has terminated. In FIG. 6, arrow 86 shows flow through the pressure relief notch 16 substantially after fuel injection is terminated.

FIG. 5 shows the piston 30 even further along in the cycle wherein the piston fully covers the exhaust port 14 and the exhaust port pressure relief notch 16. During the upstroke of the piston 30 (arrow 88), the piston 30 compresses the new charge of fuel and air in the top portion of the piston cavity 24 and the combustion chamber 46. When the piston 30 nears top dead center, the spark plug ignition electrode 50 ignites the mixture of air and fuel within the combustion chamber 46, and the piston 30 moves downward (arrow 90). Spark plug timing is typically advanced or retarded depending on throttle position, engine load and engine speed, etc.

As engine speed increases, more fuel needs to be added to the piston cavity 24 and this requires that injection into the piston cavity 24 begin earlier in the cycle. For instance, at medium or high speeds, it may be necessary to begin spraying fuel into the piston cavity 24 when the piston 30 is at bottom dead center, FIG. 1, or before. Thus, at medium or high speeds, fuel is sprayed into the piston cavity 24 and contacts the piston crown 82 underneath the converging fresh air flow from the transfer ports 56A and 56B. Liquid droplets in the fuel spray vaporize upon contacting the piston crown 82, and the ascending air flow towards the spark plug electrode 50 helps to convect vaporized fuel upwards towards the spark plug electrode 50. Short-circuiting of unburned fuel through the exhaust port 14 is minimized at medium and high speeds due to the converging air flow from the transfer ports 56A and 56B which in effect blows vaporized fuel from the piston crown 82 both away from the exhaust port 14 and upward towards the spark plug electrode 50. Air flow into the piston cavity 24 through transfer ports 56A and 56B and the boost port 58 as shown in FIGS. 1 and 2 occurs mostly during the downstroke of the piston 30 after the piston 30 has uncovered ports 56A, 56B and 58A. Thus, it is practical to locate the fuel injector opening 72 so that the lower edge of the opening 72 through the cylinder wall 12 is at essentially the same height as the top of the transfer ports 56A and 56B, or slightly above. Placing the fuel injector 70 so that the spray axis 80 enters into the piston cavity 24 at a height above the top of the transfer ports 56A and 56B and below the top of the exhaust port 14 assures that fuel will not be injected into the piston cavity 24 until the pressure within the piston cavity 24 is essentially atmospheric yet not before the converging air flow from the transfer ports 56A and 56B will be present in the piston cavity 24 to convect vaporized fuel from the piston crown 82 upward towards the spark plug electrode 50. It should therefore be appreciated that the cylinder wall fuel injection system as described thus far not only allows for the use of low-pressure fuel injectors, but also optimizes the use of converging air flows from transfer ports 56A and 56B to reduce short-circuiting of unburned fuel even when fuel is injected into the cylinder during the piston downstroke or soon thereafter.

Referring in particular to FIG. 3, the preferred exhaust port 14 preferably has an upper convex edge 77, a lower convex edge 88, and a first side edge 90 and a second side edge 92. Both the upper convex edge 77 and the lower convex edge 88 are generally parallel to a plane perpendicular to the longitudinal cylinder axis 26. The first side edge extends between a first end 77A of the upper convex edge 77 and a first end 88A of the lower convex edge 88. The second side edge 92 extends between a second end 77B of the upper convex edge 77 and a second end 88B of the lower convex edge 88. The length of the upper and lower convex edges 77 and 88 are both preferably about 1.75 inches, whereas the length of the first and second side edges 90 and 92 are preferably slightly less than 1 inch. Therefore, the flow area through the preferred exhaust port 14 is between 1.6 to 1.8 square inches.

The exhaust port pressure relief notch 16 extends upward along the cylinder wall 12 towards top dead center from the upper convex edge 77. The pressure relief notch 16 is preferably located equidistant between the first end 77A and the second end 77B of the upper convex edge 77.

It is preferred that the flow area through the pressure relief notch 16 be small compared to the flow area through the entire exhaust port 14. The preferred width of the pressure relief notch 16 as indicated by arrow 94 is approximately 0.2 inches, and should be between 5% to 15% of the total width of the exhaust port 14 (i.e. 5% to 15% of the distance between the first side edge 90 and the second side edge 92). The preferred length of the exhaust port pressure relief notch 16 as indicated by arrow 96 is approximately 0.3 inches, and should be between 20% and 40% of the total length of the exhaust port 14 in the direction parallel to the longitudinal cylinder axis 26 (i.e. 20% to 40% of the maximum distance between the upper convex edge 77 and the lower convex edge 88). Thus, the flow area of the preferred pressure relief notch 16 is less than 3% of the flow area through the entire exhaust port 14. Expressed in terms of degrees of crankshaft timing, the exhaust port should be timed to open/close no later than 60° of crankshaft rotation after/before top dead center.

FIG. 7 shows the preferred embodiment of the invention in which the combustion cylinder wall 12 consists of a cylinder sleeve 28 that is fitted into a bore for the combustion cylinder in the cylinder block 18, and the pressure relief notch 16 is located exclusively in the cylinder sleeve 28. Note that it is not necessary to machine or cast a notch into the cylinder block 18 in order to provide an effective exhaust port notch 16. Thus, an engine with conventional exhaust ports can be provided with a notched exhaust port by merely replacing the cylinder sleeve 28 with one that has a notch 16. FIG. 8 shows another embodiment of the invention in which the notch 16 is present in both the cylinder sleeve 16A and in the cylinder block 16B. Depending on the specific dimensions of a particular engine, the embodiment shown in FIG. 8 may provide less flow restriction than the embodiment shown in FIG. 7.

Figure 9:
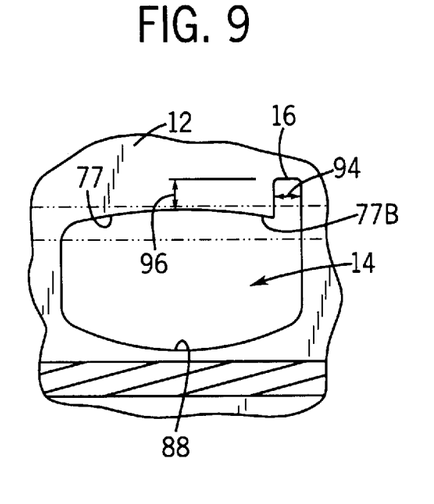
FIG. 9 is a view similar to FIG. 3 of another notched exhaust port in accordance with the invention.
Figure 10:
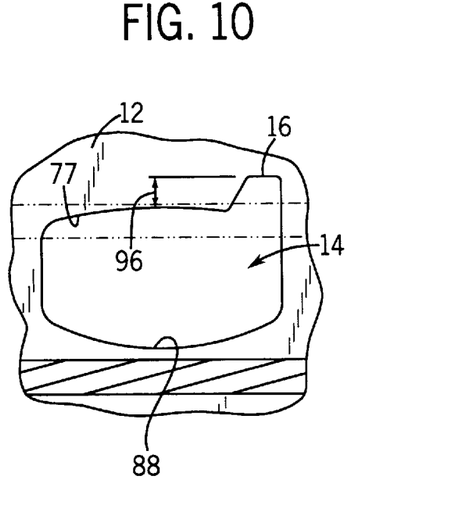
FIG. 10 is a view similar to FIGS. 3 and 9 of yet another notched exhaust port in accordance with the invention.
Figure 11:
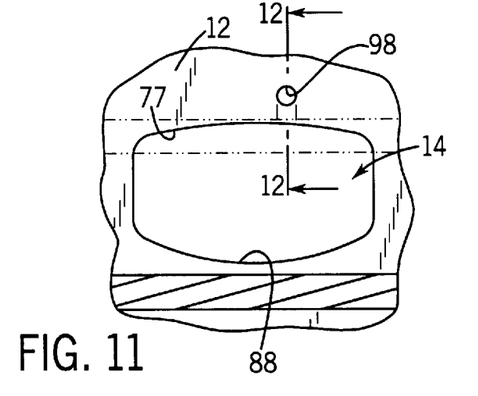
FIG. 11 is a view similar to FIG. 3 which shows an unnotched exhaust port in accordance with the invention and a pressure relief hole through the cylinder wall into the exhaust passage within the cylinder block.

FIGS. 9–20 show alternative embodiments of the invention as applied in a loop-scavenged, two-cycle engine. FIG. 9 shows an embodiment in which the exhaust port notch is located adjacent the second end 77b of the upper convex edge 77 of the exhaust port 14. In other respects, the embodiment shown in FIG. 9 is similar to the embodiment shown in FIG. 3. FIG. 10 shows another embodiment that is similar to the embodiment shown in FIG. 9, except the notch 16 is not substantially rectangular. In FIG. 10, the base of the notch 16 is wider than the top of the notch 16. Preferably, the flow area through the notch 16 is less than 3% of the flow area through the entire exhaust port 14 as in previous embodiments.

Figure 12:
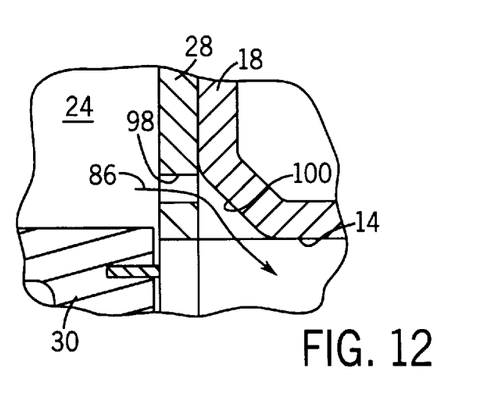
FIG. 12 is a detailed view taken along line 12—12 in FIG. 11 which shows a pressure relief hole passing through the cylinder wall into the exhaust passage within the cylinder block.
Figure 13:
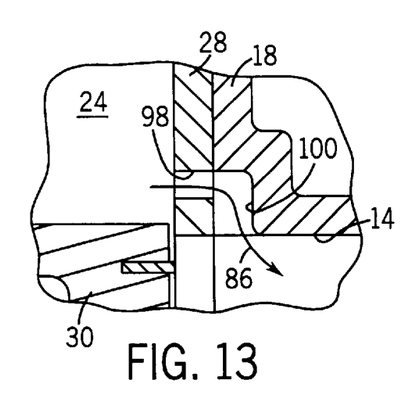
FIG. 13 is a view similar to FIG. 12 showing another embodiment of the pressure relief hole passing through the cylinder wall and into the exhaust passage within the cylinder block.
Figure 14:
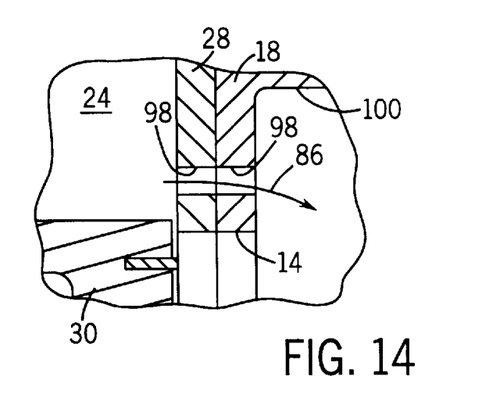
FIG. 14 is a view similar to FIGS. 12 and 13 showing yet another embodiment of the pressure relief hole passing through the cylinder wall and into the exhaust passage within the cylinder block.
Figure 15:
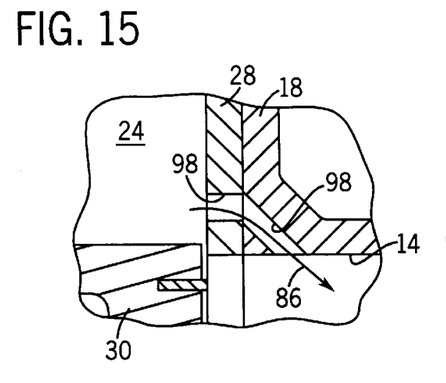
FIG. 15 is a view similar to FIGS. 12–14 showing yet another embodiment of the pressure relief hole passing through the cylinder wall and into the exhaust passage through the cylinder block.
Figure 16:
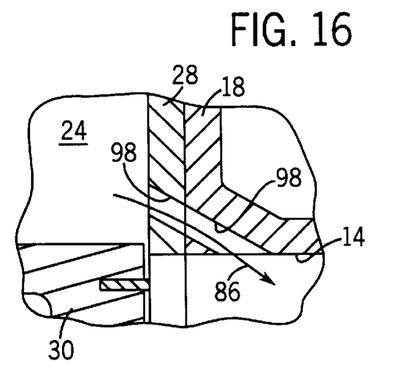
FIG. 16 is a view similar to FIGS. 12–15 showing yet another embodiment of the pressure relief hole passing through the cylinder wall and into the exhaust passage through the cylinder block.

FIGS. 11–16 show various embodiments of the invention in which a pressure relief hole 98 located through the cylinder wall 12 above the exhaust port 14 is used in lieu of a notch 16. It is preferred that the flow area through the pressure relief hole 98 be no greater than 3% of the flow area through the entire exhaust port 14. FIG. 12 shows an embodiment of the invention in which the pressure relief hole 98 is provided through the cylinder sleeve 28 directly into an opening 100 adjacent the exhaust passage 14 which is casted into the cylinder block 18. FIG. 13 shows another embodiment similar to FIG. 12 in which the opening 100 adjacent the exhaust passage has a different configuration than in FIG. 12. FIG. 14 shows an embodiment in which the pressure relief hole 98 passes through both the cylinder sleeve 28 and the cylinder block 18 into an opening 100 adjacent the exhaust passage 14. FIGS. 15 and 16 show an embodiment in which the pressure relief hole 98 passes through the cylinder sleeve 28 in the cylinder block 18 directly into the exhaust passage 14. In FIG. 16, the pressure relief hole 98 maintains a straight path through both the cylinder sleeve 28 and the cylinder block 18.

Figure 17:
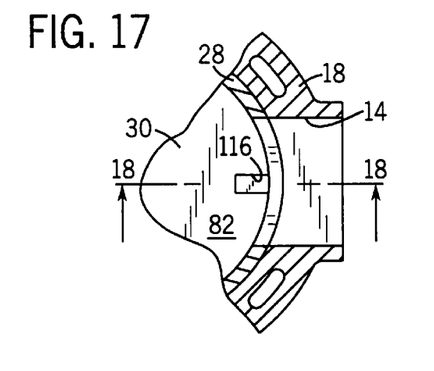
FIG. 17 is a top detailed view of another embodiment of the invention in which the piston head contains a pressure relief notch.
Figure 18:
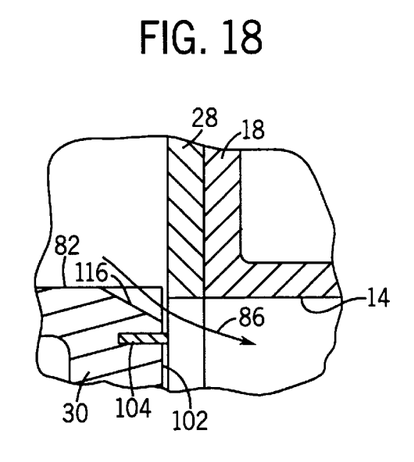
FIG. 18 is a view taken along line 18—18 in FIG. 17.
Figure 19:
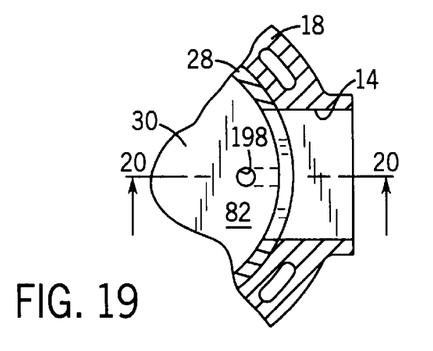
FIG. 19 is a top detailed view of another embodiment of the invention in which a pressure relief hole passes through the piston head.
Figure 20:
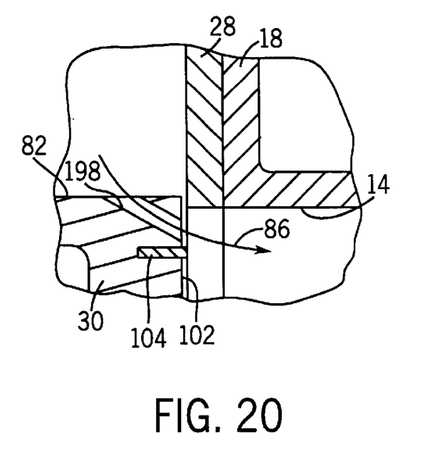
FIG. 20 is a detailed view taken along lines 20—20 in FIG. 19.
Figure 21:
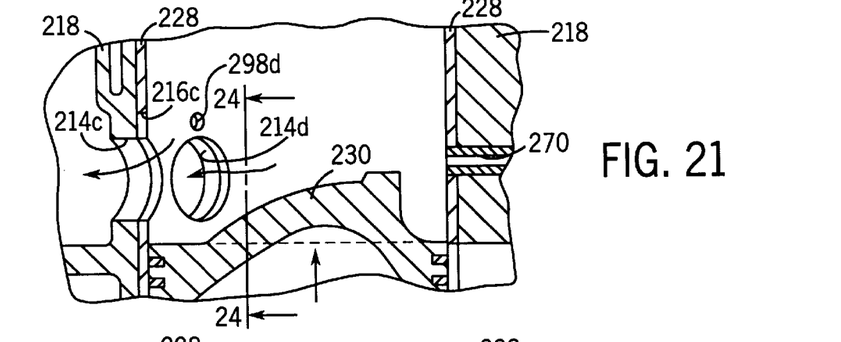
FIG. 21 is a side view of a combustion cylinder for a cross-scavenged, two-cycle internal combustion engine having a low-pressure, cylinder wall fuel injection system and a notched exhaust port and a pressure relief hole in accordance with the invention.
Figure 22:
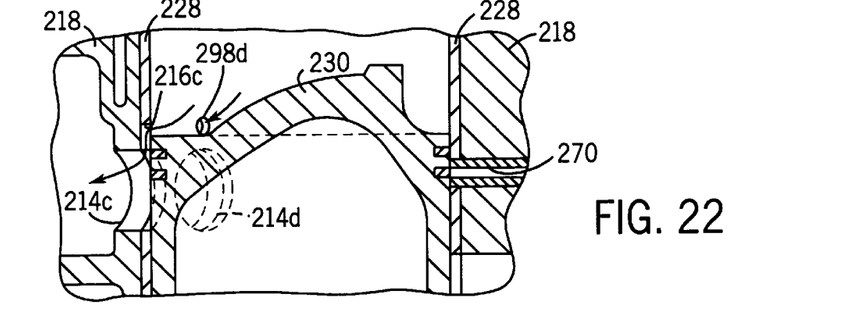
FIG. 22 is a view similar to FIG. 21 in which the piston has moved upward during the compression stroke to a position in which the piston partially covers the exhaust port pressure relief notch.
Figure 23:
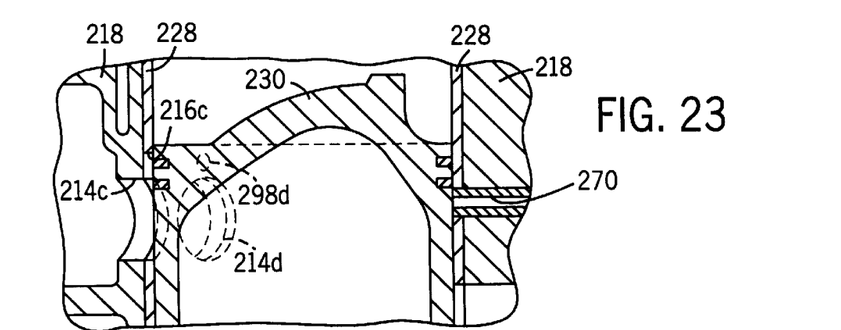
FIG. 23 is a view similar to FIGS. 21 and 22 in which the piston fully covers the pressure relief exhaust port notch and the pressure relief hole in the combustion cylinder.

FIGS. 17 and 18 show an embodiment of the invention in which a pressure relief notch 116 is located in the crown 82 of the piston 30, instead of through the cylinder wall adjacent the exhaust port 14. Note that the embodiment of the invention shown in FIGS. 17 and 18 requires no modification to the cylinder sleeve 28 or cylinder block 18. The size and location of the notch 116 on the crown 82 of the piston 30 is dictated by the same type of functional considerations as pressure relief notch 116 through the cylinder wall adjacent the exhaust port 14. FIGS. 19 and 20 show an embodiment of the invention in which a pressure relief hole 198 passes through the crown 82 of the piston 30 and out a side 102 of the piston 30. Note that both in the embodiment shown in FIGS. 17 and 18 and the embodiment shown in FIGS. 19 and 20 it is important that the piston ring 104 be located on the sidewall 102 of the piston 30 at a location below the piston notch 116, FIG. 18, or the piston hole 198, FIG. 20, respectively.

Figure 24:
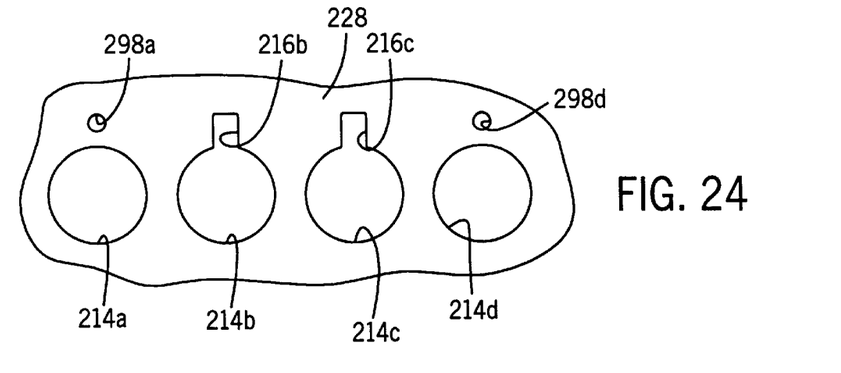
FIG. 24 is a view taken along line 24—24 in FIG. 21 showing various embodiments of the invention in a cross-scavenged engine.

Thus far, the invention has been described with respect to a loop-scavenged, two-cycle internal combustion engine. As depicted in FIGS. 21–24, the invention can also be applied to cross-scavenged, two-cycle internal combustion engines. Referring now to FIGS. 21–24, the fuel injector 270 (shown schematically) for the cross-scavenged engine is located in an opening through the cylinder block 218 and cylinder sleeve 228. The spray axis of the fuel injector is preferably horizontal, however, the crown of the piston 230 is shaped to prevent fuel from directly short-circuiting from the fuel injector 270 through the exhaust ports 214a, 214b, 214c, 214d. In contrast to the loop-scavenged engine, the cross-scavenged engine has a plurality of exhaust ports 214a, 214b, 214c, 214d. In carrying out the invention, it is not necessary that the exhaust pressure relief notch/hole for each exhaust port 214a, 214b, 214c, 214d be identical. For instance, FIG. 24 shows exhaust ports 214a and 214b using an exhaust relief hole 298a, 298d; whereas exhaust ports 214b and 214c are using exhaust pressure relief notches 216b, 216c.

The invention has been described in conjunction with several embodiments, however, it should be understood that the size, shapes and locations of the pressure relief notches and/or holes for any of the embodiments should be tailored based on the needs for the particular engine. In addition, other modifications, alternatives and equivalents to the invention may be apparent to those skilled in the art. Such modifications, alternatives and equivalents should be considered to come within the scope of the following claims.

I claim:

1. A two-cycle internal combustion engine comprising:
    a cylinder block having at least one combustion cylinder that defines a piston cavity of cylindrical shape around a longitudinal cylinder axis;
    a cylinder head attached to the cylinder block to define a combustion chamber that is in communication with the piston cavity;
    a piston that reciprocates longitudinally through the piston cavity along the cylinder axis from bottom dead center to top dead center;
    a spark plug mounted through the cylinder head so that a spark plug ignition electrode is exposed to the combustion chamber;
    a crankcase connected to the cylinder block to define a charging chamber that is in communication with the piston on the side of the piston opposite the combustion chamber;
    a transfer passage passing from the charging chamber through a transfer port in the combustion cylinder wall into the portion of the piston cavity communicating with the combustion chamber;
    an exhaust port passing through the combustion cylinder wall, the exhaust port including a pressure relief notch extending upward from an edge of the exhaust port along the cylinder wall towards top dead center;
    a fuel injector that sprays fuel into the piston cavity through the combustion cylinder wall; and
    an electronic control unit that controls the operation of the fuel injector so that fuel injection terminates before the piston completely covers the exhaust port as the piston travels from bottom dead center to top dead center;
    wherein the pressure relief notch controls pressure rise as the piston covers the exhaust port thereby rendering fuel injection pressure drops across the fuel injector predictable as the piston covers the exhaust port.

2. An engine as recited in claim 1 wherein the cylinder block includes a fuel injection opening extending through the combustion cylinder wall into the piston cavity, and the fuel injector is mounted in the fuel injector opening so that a spray axis of the fuel injector passes into the combustion cylinder at a location along the cylinder wall between an upper edge of the transfer port and an upper edge of the exhaust port from which the exhaust port pressure relief notch extends.

3. An engine as recited in claim 1 wherein the engine is a loop-scavenged, two-cycle internal combustion engine and the exhaust port is defined by:
    an upper edge that is generally parallel to a plane perpendicular to the longitudinal cylinder axis;
    a lower edge that is generally parallel to a plane perpendicular to the longitudinal cylinder axis;
    a first side edge that extends between a first end of the upper edge and a first end of the lower edge;
    a second side edge that extends between a second end of the upper edge and a second end of the lower edge; and
    wherein the pressure relief notch extends along the cylinder wall upward from the upper edge at a position equidistant from the first side edge and the second side edge.

4. An engine as recited in claim 1 wherein the flow area through the exhaust port pressure relief notch is less than 3% of the flow area through the entire exhaust port.

5. An engine as recited in claim 1 wherein the combustion cylinder wall consists of a cylinder sleeve that is fitted into a bore for the combustion cylinder in the cylinder block and the exhaust port notch is physically located exclusively in the cylinder sleeve.

6. An engine as recited in claim 1 wherein a width of the exhaust port notch in a direction perpendicular to the longitudinal cylinder axis is between 5% to 15% of a total width of the exhaust port.

7. An engine as recited in claim 1 wherein a length of the exhaust port notch in a direction parallel to the longitudinal cylinder axis is between 20% and 40% of a total length of the exhaust port in the direction parallel to the longitudinal cylinder axis.

8. An engine as recited in claim 1 wherein the engine is a loop-scavenged, two-cycle internal combustion engine and the fuel injector spray axis is directed at an angle greater than 40° with respect to a plane normal to the longitudinal cylinder axis.

9. An engine as recited in claim 1 wherein the fuel injector is an electrically controlled low-pressure fuel injector that receives fuel at a pressure between 40 psi to 100 psi.

10. An engine as recited in claim 1 wherein the piston completely covers the exhaust port including the pressure relief notch no later than 60° of crankshaft rotation before top dead center.

11. An engine as recited in claim 1 wherein the engine is a loop-scavenged, two-cycle internal combustion engine and the exhaust port passing through the combustion cylinder wall is the sole exhaust port for the combustion cylinder.

12. An engine as recited in claim 1 wherein the engine is a loop-scavenged, two-cycle internal combustion engine having two transfer passages passing from the charging chamber through a respective transfer port in the combustion cylinder wall into the portion of the piston cavity communicating with the combustion chamber and the engine further comprises:

a boost passage from the charging chamber passing into the combustion chamber through a boost port in the cylinder wall which is symmetrically located between the transfer ports on the side of the longitudinal cylinder axis opposite the exhaust port.

13. An engine as recited in claim 1 wherein the engine is a cross-scavenged, two-cycle internal combustion engine and the recited exhaust port is a first exhaust port and the cross-scavenged engine includes at least one more exhaust port defined to be a second exhaust port, and both the first and second exhaust ports include a respective pressure relief notch extending upward from an edge of the respective exhaust port along the cylinder wall towards top dead center.

14. An engine as recited in claim 13 wherein the geometry of the pressure relief notch for the first exhaust port is different than the geometry of the pressure relief notch for the second exhaust port.

15. An engine as recited in claim 1 wherein the engine is a cross-scavenged, two-cycle internal combustion engine and the recited exhaust port is a first exhaust port and the cross-scavenged engine includes at least one more exhaust port defined to be a second exhaust port, and at least one of the first and second exhaust ports includes a pressure relief notch extending upward from an edge of the respective exhaust port along the cylinder wall towards top dead center.

16. A two-cycle internal combustion engine comprising:

a cylinder block having at least one combustion cylinder that defines a piston cavity of cylindrical shape around a longitudinal cylinder axis;

a cylinder head attached to the cylinder block to define a combustion chamber that is in communication with the piston cavity;

a piston that reciprocates longitudinally through the piston cavity along the cylinder axis from bottom dead center to top dead center;

a spark plug mounted through the cylinder head so that a spark plug ignition electrode is exposed to the combustion chamber;

a crankcase connected to the cylinder block to define a charging chamber that is in communication with the piston on the side of the piston opposite the combustion chamber;

a transfer passage passing from the charging chamber through a transfer port in the combustion cylinder wall into the portion of the piston cavity communicating with the combustion chamber;

an exhaust port passing through the combustion cylinder wall, the exhaust port including a top edge;

a fuel injector that sprays fuel into the piston cavity through the combustion cylinder wall;

an electronic control unit that controls the operation of the fuel injector so that fuel injection terminates before the piston completely covers the exhaust port as the piston travels from bottom dead center to top dead center and means for relieving pressure within the cylinder as the piston covers the exhaust port, thereby rendering fuel injection pressure drops across the fuel injector predictable as the piston covers the exhaust port.

17. An engine as recited in claim 16 wherein said means for relieving pressure within the cylinder as the piston covers the exhaust port comprises a pressure relief notch extending upward from an edge of the exhaust port along the cylinder wall towards top dead center.

18. An engine as recited in claim 16 wherein said means for relieving pressure within the cylinder as the piston covers the exhaust port comprises a pressure relief hole located above the exhaust port through the cylinder wall from the piston cavity into an exhaust port passage.

19. An engine as recited in claim 16 wherein said means for relieving pressure within the cylinder as the piston covers the exhaust port comprises a notch in a crown of the piston at a location corresponding to the exhaust port and a piston ring that is located on the wall of the piston below the notch.

20. An engine as recited in claim 16 wherein said means for relieving pressure within the cylinder as the piston covers the exhaust port comprises an exhaust pressure relief hole in a crown of the piston and through a side of the piston at a location corresponding to the exhaust port and a piston ring located on the wall of the piston at a location below the exhaust pressure relief hole through the piston.

* * * * *